June 14, 1927.
C. COBB ET AL
1,632,643
SPEED AND DIRECTION INDICATOR
Filed April 15, 1922
2 Sheets-Sheet 1
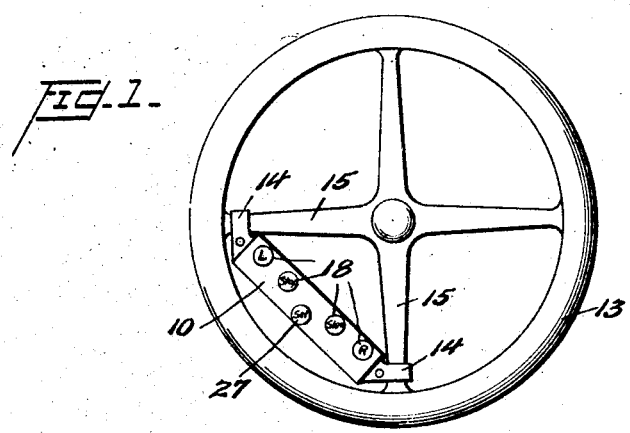
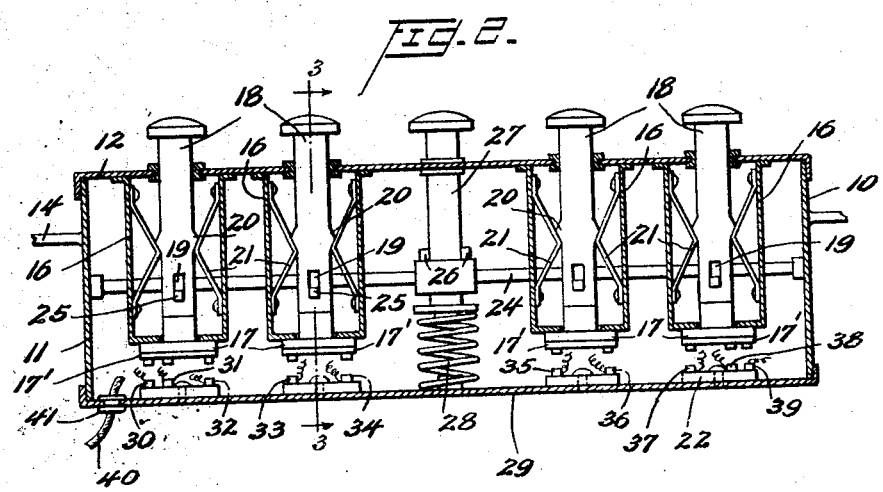
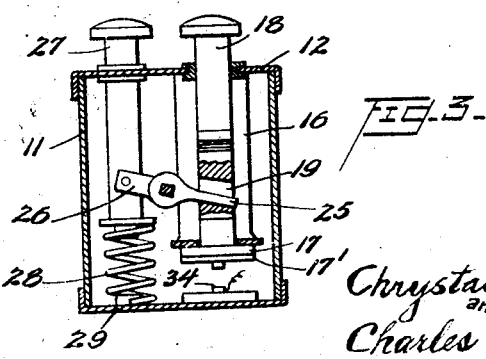
Inventor
Chrystal Cobb
and
Charles C. Marshall
Wm. D. Shoemaker
Attorney June 14, 1927.
C. COBB ET AL
1,632,643
SPEED AND DIRECTION INDICATOR
Filed April 15, 1922          2 Sheets-Sheet 2
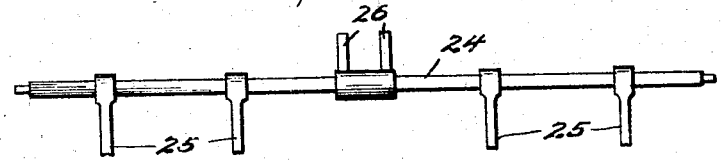
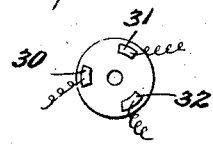
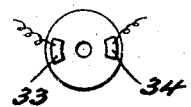
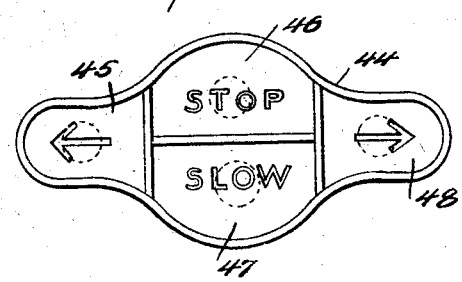
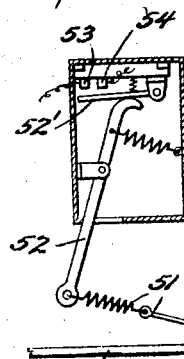
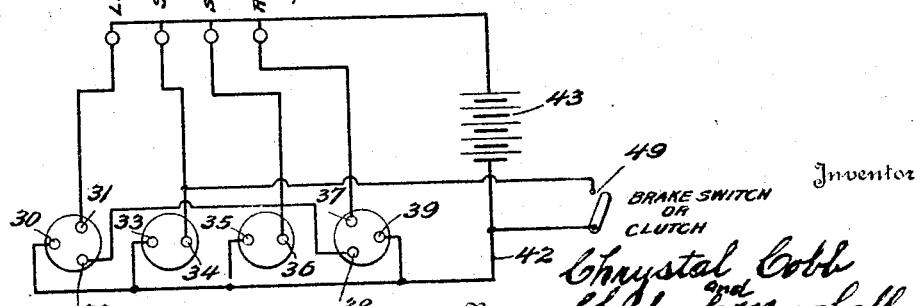
Inventor
Chrystal Cobb
and
Charles C. Marshall
By Wm. D. Shoemaker Attorney Patented June 14, 1927.

1,632,643

UNITED STATES PATENT OFFICE.

CHRYSTAL COBB AND CHARLES C. MARSHALL, OF AKRON, OHIO.

SPEED AND DIRECTION INDICATOR.

Application filed April 15, 1922. Serial No. 553,275.

This invention relates to speed and direction indicators for vehicles, and more particularly to such an indicator in which a lamp box is located at the rear of the vehicle and provided with compartments selectively illuminated to present different indicia, the controls for the illumination being located in convenient position to be operated by the driver of the vehicle.

It has for its object the production of an indicator in which a given indicium may be set for exhibition and maintained. A further object is the provision of a novel circuit arrangement whereby the signal corresponding to Caution may be actuated either alone or whenever the signals indicating a turn to either the right or to the left are set. A further object of the invention is the production of a bank of controls located upon the steering wheel by means of which signals may be set and maintained until released by a special key.

Other objects and advantages of the invention will hereinafter appear in the following description and the novel features thereof will be particularly pointed out in the appended claims.

Like reference numerals indicate like parts throughout the several figures of the drawings, in which—

Figure 1 is a plan showing the bank of controls upon the steering wheel of a motor vehicle, Figure 2 is a sectional view through the casing containing the controls, Figure 3 is a similar view taken upon the line 3—3 of Figure 2;

Figure 4 is a detail of the release rod for the controls;

Figures 5 and 6 are face views of switch elements carrying contacts;

Figure 7 is a face view of one form of lamp box capable of use with our invention, Figure 8 is an elevation of a switch and actuating element therefor for applying the signal Stop when the brake is applied, and Figure 9 is a diagrammatic view of the circuits involved in the invention.

The invention may be embodied in various forms without departing from the spirit thereof; the embodiment herein shown and described is only one form thereof, and is therefore to be considered as indicative only. The details may be changed and the form of the several parts altered.

The vehicle indicator comprises a casing 10 mounted preferably upon the steering wheel and containing a bank of key switches controlling through suitable circuits the illumination of compartments in a lamp box at the rear of the vehicle. It also comprises a switch adapted to be controlled from the brake or clutch operator of the vehicle. The method of connecting the circuits is an essential portion of the invention. These parts will be now described in detail and their individual functions pointed out, after which a recital of their conjoint use will be given.

The casing 10 comprises a body 11 and a cover 12; it is mounted upon the steering wheel 13 by means of the attaching hooks or clamps 14 encircling the spokes 15 of the wheel. Depending from the under face of the casing cover is a series of strap frames 16 of generally U-shape. In the bottom of the U-frame there is an aperture, in which reciprocates a switch plunger 18 having an end of insulating material faced with a metal plate and contacts 17'. The upper end of this block 17 is securely attached to the lower end of the plunger, which reciprocates through a bushed aperture in the cover. These plungers are provided with a vertically disposed slot 19, for a purpose to be hereinafter set forth, and with angle projections 20 designed to coact with an angle spring 21 secured to each leg of the U-frame at one of its ends and having its opposite end free to move along the frame legs.

It will be seen that upon a depression of a control button, the plunger 18 will be pressed downward, so that the projections 20 will ride past the apex of the spring 21, which will bring the metal face and contacts 17' of the switch block 17 into juxtaposition with the points carried by the blocks 22. It will be seen that the spring 21 in the depressed position of the buttons 18 will tend to hold the points carried by the switch blocks in perfect contact.

In the present embodiment of the invention, there is mounted within the casing 10 a bank of four controls. There is also mounted within the casing the release or return rod 24 carrying a series of arms 25, each taking into the vertical slot of a control plunger. The release or return rod is mounted in the side walls of the casing in any suitable manner, and is provided with a pair of lugs 26 between which is pivoted a release plunger 27. This release plunger reciprocates in a opening in the top of the case and is pivoted to the arms 26. A spring 28 tends to maintain the plunger 27 in raised position, and hence the arms 25 in lowered position, as shown in Figure 3.

The bottom 29 of the case is shown as removable and carries a series of insulating blocks 22, in which are mounted in any suitable manner contacts numbered 30 to 39 inclusive. To each of these contacts there is attached in any suitable manner, as by soldering the end of a wire, which wires are collected in a cable 40 passing out of the casing through an insulating bushing 41.

Reference might be had to Figure 9 for a better understanding of the manner of connecting the wires to the contacts. Contacts 30, 33, 35 and 39 are connected to the wire 42 leading from the battery 43. Contacts 31, 34, 36 and 37 lead to four lamps represented by the signals Left, Stop, Slow and Right. Contacts 32 and 38 are connected to the lead from contacts 36 to signal Slow. It will be seen therefore that when any one of the control plungers 18 is depressed that the contacts under that plunger will be connected together and a corresponding illumination of signals will take place. For instance, if the plunger to the left of Figure 2 is depressed current will pass from the battery 43 to contact 30 and through contacts 31 and 32 to the signals Left and Slow, whereby a combination of these signals will be given to the driver following; if the plunger next to this plunger is depressed current will pass through contacts 33 and 34 and only the signal Stop given. Likewise if the plunger to the right of Figure 2 were depressed a combination of signals Right and Slow will be given, and when the remaining plunger is depressed only the signal Slow will be given.

At a convenient place to the rear of the vehicle, preferably upon the guard for the rear wheel, is mounted a lamp box 44 of any suitable design, that shown in Figure 7 having been selected for the purpose of illustration. The lamp box is divided into compartments 45, 46, 47 and 48 corresponding to the signals Left, Stop, Slow and Right, respectively. In each of the compartments there is a lamp controlled by the leads from contacts 31, 34, 36 and 37.

Again referring to Figure 9, it will be seen that we have provided means whereby the signal Stop will be given when the brake is applied or when the clutch is released. The brake or clutch switch is diagrammatically represented by the numeral 49 and leads therefrom are extended to the wire 42 and to the lead from the contact 34 to the signal Stop. The details of the switch are shown in Figure 8 in which 50 indicates the operating rod for the brake or it may be a rod moved in the act of releasing the clutch. A yielding connection 51 is provided between this rod and a lever 52 pivoted to a part of the vehicle, and as shown having its end in a suitable casing. The end of the lever controls a spring pressed plate 52' which when lifted establishes electrical connection between the terminals 53 and 54, which constitute the switch elements represented by the numeral 49 in Figure 9.

From the foregoing description, the operation of the several parts will be understood. The casing 10 has been made with removable cover and bottom for the purpose of permitting the easy assemblage of the parts. The rod 24 is first placed in the casing. The cover with the plungers attached is placed in position with the arms 25 projecting into the slots 19. The pivot pin is then inserted through the arms 26 and the plunger 27. The bottom of the casing is next put in place and fastened to the casing body.

Upon the depression of one of the control plungers 18 the springs 21 and projections 20 will hold it depressed until the plunger 27 is depressed, when the arms 25 will lift the depressed plunger 18. The slot 19 is of such shape and size that it will permit movement of the arm 25 therein in the lifting of a companion plunger and it also holds the plunger head in fixed position, so that the indicia thereon will be in proper reading position for a driver of the machine. This holding of the plunger against rotation is also desirable where contacts are provided on the plate 17' so as to insure proper positioning with respect to the contacts on the block 22.

It now remains to set forth the conjoint operation of the several parts. If it is desired by the driver of a vehicle to turn to the right, he will depress the plunger 18 to the right in Figure 2 which will cause the double illumination of the compartments 47 and 48 in the lamp box at the rear of the vehicle. If he desires to turn to the left, he will depress the plunger 18 to the left of Figure 2 when the double illumination of compartments 45 and 47 will take place. If it is desired to indicate Slow only, this may be done by a depression of the plunger to the right of the center of the casing, and if Stop, the plunger at the left of the center. This control of the lamp box illumination does not affect the brake switch control of the signal stop.

After any plunger 18 is depressed, it will remain depressed until released by a depression of the release plunger 27, which is normally maintained in a lifted position by the spring 28.

Having described our invention, what we claim as new and desire to secure by Letters Patents is:

1. In a bank of control switches for a series of coacting electric circuits, an enclosing casing, a plurality of pairs of contacts supported upon the bottom of said casing, a plurality of frames depending from the top of said casing, a plurality of switches slidably mounted in said frames and adapted to bridge the pairs of contacts, means for yieldingly maintaining said switches in either circuit make or break position, and means for shifting all of said switches from circuit breaking position comprising a rod mounted in the sides of the casing and having lugs engaging the switches.

2. In a bank of control switches for a series of coacting electric circuits, an enclosing casing, a plurality of pairs of contacts supported upon the bottom of said casing, a plurality of frames depending from the top of said casing, a plurality of switches slidably mounted in said frames and adapted to bridge the pairs of contacts, means for yieldingly maintaining said switches in either circuit make or break position, and means for shifting all of said switches from circuit breaking position, said switches and shifting means having shanks projecting above the casing top, the shifting shank occupying a central position.

3. In a switch for an electric circuit, a casing, a contact block on the bottom thereof, a frame above the block consisting of a piece of metal of substantially U-shape having a guide aperture in its base, a switch slidably mounted in the frame and guided in said aperture, springs attached to the side walls of the frame for holding the switch in either circuit making or circuit breaking position, the switch projecting beyond the casing and adapted to be depressed into circuit making position, and means for shifting the switch to circuit breaking position.

In testimony whereof we affix our signatures.

CHRYSTAL COBB.
CHARLES C. MARSHALL.